United States Patent [19]

Baker

[11] Patent Number: 4,599,822
[45] Date of Patent: Jul. 15, 1986

[54] VERMIN TRAP

[76] Inventor: Stanley Z. Baker, 3115 Bremerton Rd., Pepper Pike, Ohio 44124

[21] Appl. No.: 484,275

[22] Filed: Apr. 12, 1983

[51] Int. Cl.⁴ ............................................. A01M 1/14
[52] U.S. Cl. .......................................... 43/114; 43/58
[58] Field of Search ................ 43/114, 113, 115, 116, 43/117, 58, 121; 156/78, 79; 424/77

[56] References Cited

U.S. PATENT DOCUMENTS

| 1,386,922 | 8/1921 | Calovi . | |
| 1,545,005 | 7/1925 | Meyer et al. . | |
| 3,864,866 | 2/1975 | Kosinsky | 43/58 |
| 3,913,259 | 10/1975 | Nishimura | 43/114 |
| 4,424,642 | 1/1984 | Stubler | 43/114 |
| 4,438,584 | 3/1984 | Baker | 43/58 |
| 4,521,466 | 6/1985 | White | 156/78 |

FOREIGN PATENT DOCUMENTS

| 130811 | 5/1901 | Fed. Rep. of Germany | 43/116 |
| 0085501 | 5/1980 | Japan | 43/132.1 |

Primary Examiner—Nicholas P. Godici
Assistant Examiner—Kurt Rowan
Attorney, Agent, or Firm—Body, Vickers & Daniels

[57] ABSTRACT

A trap for rats, mice and other vermin and of the character including a layer of tacky, thermoplastic, pressure sensitive adhesive and a support therefor which is generally in the form of a shallow tray is improved by aerating the adhesive to provide a multiplicity of trapped gas bubbles therein.

20 Claims, 2 Drawing Figures

VERMIN TRAP

BACKGROUND OF THE INVENTION

This invention relates to the art of vermin traps and, more particularly, to an improved vermin trap of the character including a layer of tacky, thermoplastic, pressure sensitive adhesive to which the vermin stick upon coming into contact therewith.

Vermin traps have been provided heretofore by coating a tacky, thermoplastic, pressure sensitive adhesive onto a suitable support which is then positioned in an area where vermin tend to move so that when the vermin come into contact with the adhesive they are unable to extricate themselves, whereby they either die or can be killed and suitably disposed of. One such vermin trap especially for trapping larger vermin such as rats and mice is disclosed in copending patent application Ser. No. 338,621 filed Jan. 11, 1982 in which I am a co-inventor, and which application is a continuation of application Ser. No. 53,381 filed June 29, 1979, the disclosures of which are hereby incorporated herein by reference. The present invention relates to an improvement which will be described in detail hereinafter in connection with the vermin traps disclosed in the aforesaid copending application. However, as will become apparent hereinafter, the improvement is applicable to other vermin traps of the character using a tacky, thermoplastic, pressure sensitive adhesive and to the use of such adhesives having characteristics other than those particularly disclosed in the aforesaid copending application.

Vermin traps of the character to which the present invention is directed generally have been provided heretofore by placing a homogeneous layer of tacky, thermoplastic, pressure sensitive adhesive in a shallow tray-like receptacle into which small vermin crawl and onto which larger vermin such as rats and mice step when the trap is placed in an area of vermin activity. The adhesive material can be melted and poured into such a tray to form the tacky adhesive character upon cooling, as is disclosed in the aforementioned copending application, or the adhesive may be supplied in a tacky condition such as in a large container from which quantities are withdrawn and suitably spread into place in a container.

Such traps are extremely effective for very small vermin such as insects and spiders and, in most instances, are extremely effective for trapping larger vermin such as mice and rats. In connection with trapping vermin of the latter character, however, effectiveness of the trap depends to some extent on the size or weight and strength of the vermin as well as to the extent of contact made by the vermin with the pressure sensitive adhesive. More particularly in this respect, it will be appreciated that trapping of the vermin requires sufficient contact and penetration of the pressure sensitive adhesive to avoid the vermin being able to extricate itself from such contact. While the pressure sensitive adhesive is tacky and somewhat soft, the homogeneous nature thereof heretofore has resulted in vermin escapes as a result of inadequate penetration necessary to preclude or minimize the vermin's capability to extricate itself. When it is considered that such adhesive-type traps used in highly vermin infested areas such as zoos can result in the destruction of several thousand rats and mice over a period of a few months, it will be appreciated that it becomes very desirable to either increase the number of vermin trapped over a given period of time or to reduce the time required to destroy a given number of vermin by minimizing such escapes.

SUMMARY OF THE INVENTION

In accordance with the present invention, escapes from pressure sensitive adhesive traps of the foregoing character are minimized by aerating the adhesive with a suitable gas, such as air, carbon dioxide, nitrogen or other inert gas, so as to trap minute bubbles of the gas in the adhesive material. This effectively increases penetration of the adhesive material upon contact thereof by a vermin, without affecting the tackiness of the adhesive material, whereby the possibility of extrication by the vermin is substantially reduced. For example, if the foot of a rat contacts the adhesive with a light force which would enable extrication with a homogeneous layer of adhesive as heretofore used, the porosity of the adhesive according to the present invention would, under the same force of contact, promote a penetration of the adhesive and thus an increase in the area of contact between the foot of the rat and the adhesive which would negate extrication. More particularly in this respect, it will be appreciated that the trapped gas bubbles effectively provide membranes of adhesive material which collapse in response to penetration or pressure caused by the rat's claws, or weight. Therefore, the rat's foot not only penetrates deeper than would be the case with a homogeneous adhesive mixture, but such penetration is also accompanied by a physical collapsing of the adhesive material so that the rat's foot is more effectively surrounded by adhesive.

Of further advantage is the fact that the trapped gas bubbles enable reducing the amount of adhesive material required for a given trap size, thus advantageously reducing cost both in connection with the manufacture and in connection with transportation as a result of considerable weight reduction.

Preferably, the gas bubbles are between about 0.030 inch to about 0.060 inch in diameter, and the adhesive material is aerated to an extent whereby the porosity of the material provides a weight reduction of from about 20% to about 40% of the weight of a given quantity of the same material when not aerated. Preferably too, the bubbles are produced by mixing a gas with the adhesive material in a molten condition and under pressure, and then flowing the molten material at atmospheric pressure into a tray-like receptacle wherein the adhesive cools to establish the tacky, pressure sensitive character thereof. Further in accordance with the preferred embodiment, the pressure sensitive adhesive is one having a plastic flow temperature above about 120° F., whereby under potentially warm temperature conditions for storage, transportation and use, the adhesive material will not soften and flow from the receptacle.

It is accordingly an outstanding object of the present invention to provide an improved vermin trap of the character including a supported layer of tacky, thermoplastic, pressure sensitive adhesive.

Another object is the provision of a trap of the foregoing character having improved capabilities with respect to preventing escape of vermin making contact with the adhesive.

A further object is the provision of a trap of the foregoing character in which the layer of adhesive is aerated, thus to promote penetration of the adhesive upon contact therewith by vermin.

Yet another object is the provision of a trap of the foregoing character which requires less adhesive material for a given volume to be used in a trap, thus promoting economy in production and transportation, while promoting improved efficiency in connection with trapping vermin.

Still a further object is the provision of a method of making an improved vermin trap including a tacky, thermoplastic, pressure sensitive adhesive, and which method enables a more economical use of adhesive material while providing improved trapping efficiency in connection with use of the trap.

BRIEF DESCRIPTION OF THE DRAWINGS

The foregoing objects, and others, will in part be obvious and in part pointed out more fully hereinafter in conjunction with the written description of a preferred embodiment illustrated in the accompanying drawings in which.

DESCRIPTION OF A PREFERRED EMBODIMENT

Figure 1:
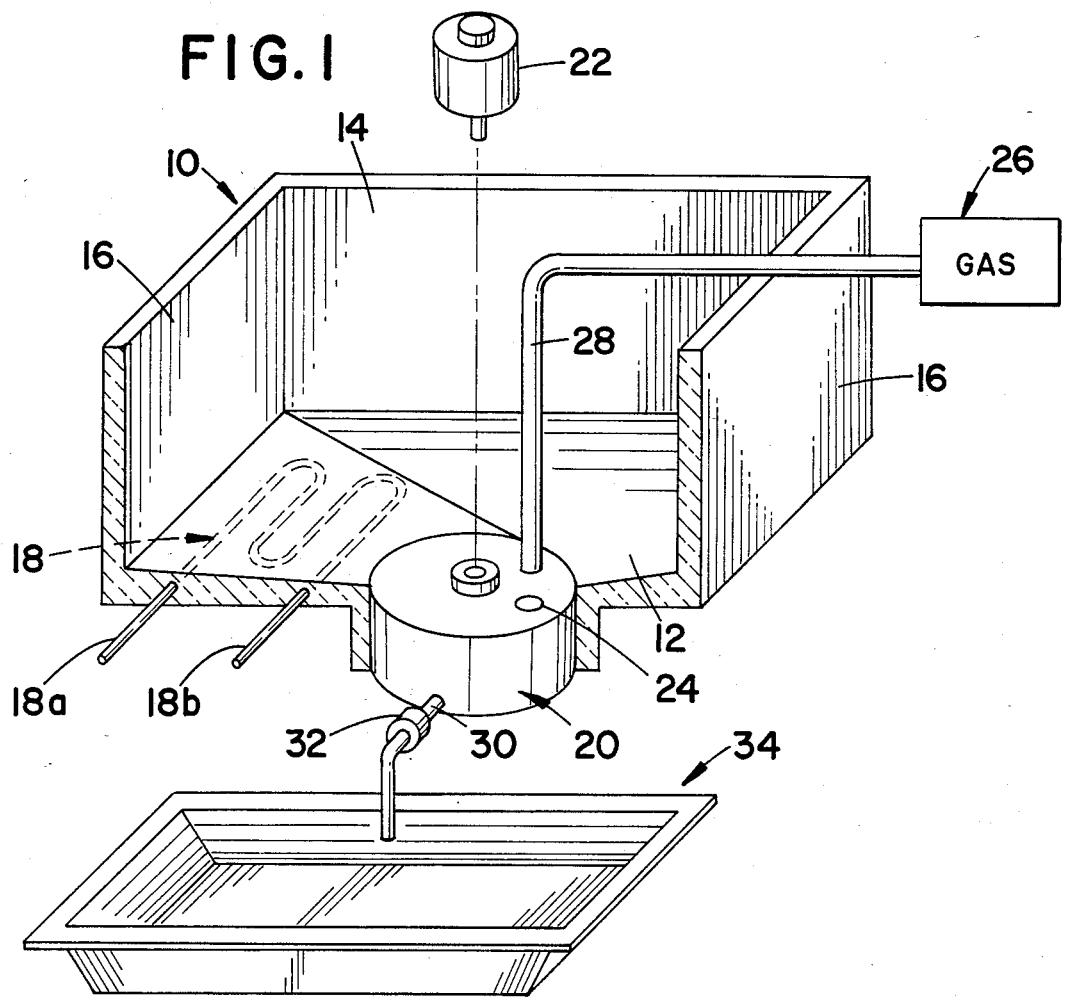
FIG. 1 is a somewhat schematic perspective view showing apparatus for making a vermin trap in accordance with the present invention; and, FIG. 2 is a sectional elevation view of a vermin trap according to the invention.

Referring now to the drawings wherein the showings are for the purpose of illustrating a preferred embodiment of the invention only, and not for the purpose of limiting the invention, FIG. 1 illustrates apparatus used in the practice of the invention and which includes a melting tank 10 which provides a reservoir adapted to receive and melt a solid thermoplastic adhesive, or to receive a molten thermoplastic adhesive and to maintain the latter in the liquid state. The reservoir is defined by a bottom wall 12, rear wall 14, side walls 16 and a front wall which is cut away for purposes of clarity, and the reservoir may be closed during use by a removable cover, not shown. In order to melt and/or maintain a thermoplastic adhesive in the liquid state, it will be appreciated that suitable heating devices are employed in the melting tank. In FIG. 1, and by way of example only, such a heating device is illustrated as an electrical resistance heater 18 embedded in bottom wall 12 of the tank and having leads 18a and 18b connectable across a suitable source of electric power, not shown. The melting tank further includes a rotary gear pump 20 driven by a motor 22 which may, for example, be a pneumatic motor, and pump 20 includes an inlet port 24 toward which bottom wall 12 of the reservoir slopes. A gas, preferably carbon dioxide, is supplied at a pressure slightly above that of atmosphere to the inlet area of pump 20 from a gas source 26 through a gas supply line 28 which opens into pump 20. The hot liquid adhesive and gas flow into the interior of pump 20, and the gas and liquid adhesive are thoroughly mixed in the pump and forced under pressure into a liquid adhesive-gas solution which then flows from the outlet of the pump through a discharge conduit 30 which is provided with a suitable dispensing control valve 32. When the dispensing valve is open, the liquid adhesive-gas solution flows into a shallow plastic tray 34 which provides a support for the adhesive in connection with a vermin trap made in accordance with the preferred embodiment.

The gear pump is operable to increase the pressure of the gas and hot liquid adhesive mixture to a pressure considerably above atmospheric pressure and which pressure is maintained through conduit 30 to dispensing control valve 32. This pressure provides for the gas contained within the hot liquid adhesive to be maintained in solution therewith until dispensed into tray 34. When dispensing valve 32 is opened to allow the liquid adhesive-gas solution under high pressure to flow to tray 34 at atmospheric pressure, the hot liquid adhesive-gas solution quickly expands producing tiny gas bubbles throughout the liquid adhesive and which are entrapped within the adhesive as it fills the tray and begins to cool and set to its tacky pressure sensitive state. The specific structure of the melting tank, gear pump, gas supply and dispensing control components described hereinabove do not form a part of the present invention, and reference may be had to U.S. Pat. No. 4,059,714 for a structural illustration of the manner in which these component parts operate and cooperate in connection with mixing and pressurizing a solution of thermoplastic adhesive material and gas.

Figure 2:
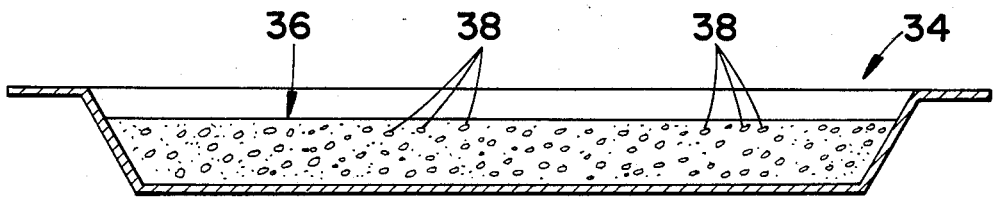

As will be appreciated from the illustration in FIG. 2 of the drawing, the expanded liquid adhesive-gas solution is dispensed into tray 34 to provide an aerated adhesive layer 36 which is characterized by a multiplicity of gas bubbles 38 dispersed therethroughout. Gas bubbles 38 are trapped within the liquid adhesive poured into the tray and accordingly remain trapped in the adhesive layer when the latter cools to provide the finished trap with a layer of tacky, pressure sensitive adhesive.

In the preferred embodiment of a vermin trap in accordance with the present invention, the thermoplastic, pressure sensitive adhesive used is available from Findley Adhesives, Inc. of Milwaukee, Wisconsin under the latter's product designation 793-334-09. The latter adhesive is preferred for its known insensitivity to normal temperature variations which may expectedly be encountered in connection with use of the vermin trap. More particularly in this respect, the latter adhesive when heated, poured into a support tray and cooled will remain tacky down to a temperature of about 20° F. and will not experience plastic flow up to a temperature of about 120° F. These characteristics not only provide for effectiveness of the trap as such within this temperature range, but also advantageously enable a pair of trays similar to tray 34 to be partially filled with adhesive and placed open side-to-side to facilitate packaging, shipping and storage without danger of the adhesive material melting and flowing together in the area between the facially engaged trays. Further in accordance with the preferred embodiment, the layer of adhesive has a thickness in the direction from the bottom of the tray to the open upper end thereof of from about 1/16 inch to about ¼ inch, and it will be appreciated that the tray has a depth which accommodates the desired thickness of the adhesive layer with spacing between the top surface of the adhesive and the upper end of the tray to avoid facial engagement between the layers of adhesive in two trays positioned face-to-face for packaging, transportation and storage purposes.

Further in connection with the preferred embodiment, the foregoing adhesive material has a melting temperature between 200° F. and 250° F. and is maintained in the reservoir of the melting tank prior to mixing with gas at a temperature between about 250° F. and about 300° F. and, preferably, at about 275° F. which is the preferred pouring temperature for the adhesive-gas solution. The gas mixed with the molten adhesive preferably is carbon dioxide, although air or nitrogen for example can be used. Preferably, the amount of carbon dioxide flowed into the pump is that sufficient to provide for aerating the adhesive material to an extent which provides a weight reduction of from about 20% to about 40% relative to a given quantity of the same adhesive material which is not aerated. Furthermore, it is preferred to mix the liquid adhesive and carbon dioxide at a pressure of from about 1,000 psi to about 1,500 psi so as to produce bubble diameters in the expanded solution ranging in size from about 0.030 inch to about 0.060 inch.

While a preferred adhesive material, apparatus and operating parameters are described hereinabove in connection with producing an aerated thermoplastic, pressure sensitive adhesive for vermin traps in accordance with the present invention, it will be appreciated that other adhesives can be employed and that other apparatus and methods can be devised for achieving aeration to provide a vermin trap without departing from the principles of the present invention. For example, another adhesive material having the desired tacky, pressure sensitive characteristic for vermin traps but having a much lower plastic flow temperature upon its placement in or on a support to provide a trap is marketed by Southern Mill Creek Products Company, Inc. of Tampa, Fla. under the company's trademark TRAP-STIK. While a high plastic flow temperature is preferred for the reasons set forth hereinabove. it will be appreciated that pressure sensitive adhesives of the character suitable for vermin traps, such as the latter adhesive, can be aerated to provide a vermin trap adhesive having a multiplicity of entrapped gas bubbles therein when the adhesive is in its semi-solid use state. Moreover, while the gas bubble size and the degree of porosity as determined by the reduction in weight referred to hereinabove are preferably within the ranges set forth, it will be appreciated that other ranges may be found to be suitable in connection with other adhesives. In connection with achieving aeration of a pressure sensitive thermoplastic vermin trap adhesive in accordance with the present invention, it will likewise be appreciated that methods of achieving aeration may be devised which will depart from the use of apparatus as described herein and/or may employ similar apparatus with variations in the operation thereof. For example, an arrangement might be devised which would employ the inherent suction at the intake of the pump to draw the gas thereinto as opposed to flowing the gas to the pump at a positive pressure, and other apparatus might be devised to achieve agitation of the molten thermoplastic adhesive with gas so as to provide for entrapping gas bubbles in the adhesive poured into the tray or other support component. Still further, while it is preferred as disclosed herein to pour the liquid adhesive-gas solution into a tray which provides the support for the adhesive in connection with its end use as a trap, it will be appreciated that the adhesive could be dispensed into a large receiving tray to form a sheet-like layer which, after cooling, could be cut to size and placed in a tray similar to that illustrated herein, or onto a flat supporting substrate for use.

The foregoing and other modifications of the preferred embodiment herein illustrated and described will be apparent or obvious to those skilled in the art, whereby it is to be distinctly understood that the foregoing descriptive matter is to be interpreted merely as illustrative of the present invention and not as a limitation.

Having thus described the invention, it is claimed:

1. In a vermin trap of the character comprising a layer of pressure sensitive adhesive and means to support said layer of adhesive, the improvement comprising: said layer of adhesive having gas bubbles trapped therein, said gas bubbles providing for a given quantity of said adhesive to weigh from about 20% to about 40% less than the same quantity without bubbles.

2. In a vermin trap of the character comprising a layer of pressure sensitive adhesive and means to support said layer of adhesive, the improvement comprising: said layer of adhesive having gas bubbles trapped therein, said gas bubbles having a diameter of from about 0.030 inch to about 0.060 inch.

3. In a vermin trap of the character comprising a layer of pressure sensitive adhesive and means to support said layer of adhesive, the improvement comprising: said layer of adhesive having gas bubbles trapped therein, said layer of adhesive having a plastic flow temperature of about 120° F., and said gas bubbles having a diameter of from about 0.030 inch to about 0.060 inch.

4. The vermin trap according to claim 6, wherein said layer of adhesive is from about 1/16 inch to about ¼ inch in thickness.

5. In a vermin trap of the character comprising a layer of pressure sensitive adhesive and means to support said layer of adhesive, the improvement comprising: said layer of adhesive having gas bubbles trapped therein, said layer of adhesive having a plastic flow temperature of about 120° F., and said gas bubbles providing for a given quantity of said adhesive to weigh from about 20% to about 40% less than the same quantity without bubbles.

6. A vermin trap according to claim 11, wherein said gas bubbles have a diameter of from about 0.030 inch to about 0.060 inch.

7. In a vermin trap of the character comprising a layer of pressure sensitive adhesive and means to support said layer of adhesive, the improvement comprising: said layer of adhesive having gas bubbles trapped therein, said gas bubbles providing for a given quantity of said adhesive to weigh from about 20% to about 40% less than the same quantity without bubbles, and said gas bubbles having a diameter of from about 0.030 inch to about 0.060 inch.

8. In a vermin trap of the character comprising a layer of pressure sensitive adhesive and means to support said layer of adhesive, the improvement comprising: said layer of adhesive having gas bubbles trapped therein, said gas bubbles providing for a given quantity of said adhesive to weigh from about 20% to about 40% less than the same quantity without bubbles, and said layer of adhesive being from about 1/16 inch to about ¼ inch in thickness.

9. In a vermin trap of the character comprising a layer of pressure sensitive adhesive and means to support said layer of adhesive, the improvement comprising: said layer of adhesive having gas bubbles trapped therein, said gas bubbles having a diameter of from about 0.030 inch to about 0.060 inch, and said layer of adhesive being from about 1/16 inch to about ¼ inch in thickness.

10. A method of making a vermin trap comprising, heating a thermoplastic pressure sensitive adhesive to convert it to a liquid state, aerating said liquid adhesive with carbon dioxide, flowing said aerated liquid adhesive onto a support, and cooling said aerated liquid adhesive.

11. A method of making a vermin trap comprising, heating a thermoplastic pressure sensitive adhesive to convert it to a liquid state, agitating said liquid adhesive with carbon dioxide to obtain a mixture of said carbon dioxide in said liquid adhesive pressurizing said mixture, and flowing said pressurized mixture at atmospheric pressure onto a support, whereby said carbon dioxide is released to form bubbles trapped in said liquid adhesive, and cooling said liquid adhesive.

12. A method of making a vermin trap comprising, heating a thermoplastic pressure sensitive adhesive to convert it to a liquid state, agitating said liquid adhesive with a gas to obtain a mixture of said gas in said liquid adhesive, pressurizing said mixture, flowing said pressurized mixture at atmospheric pressure onto a support, whereby said gas is released to form bubbles trapped in said liquid adhesive, said support being an open top tray, flowing said mixture into said tray to a depth of from about 1/16 inch to about ¼ inch, and cooling said liquid adhesive.

13. A method of making a vermin trap comprising, heating a thermoplastic pressure sensitive adhesive to convert it to a liquid state, agitating said liquid adhesive with a gas to obtain a mixture of said gas in said liquid adhesive, pressurizing said mixture from about 1,000 psi to about 1,500 psi, flowing said pressurized mixture at atmospheric pressure onto a support, whereby said gas is released to form bubbles trapped in said liquid adhesive, and cooling said liquid adhesive.

14. The method according to claim 13, wherein said gas is carbon dioxide.

15. The method according to claim 14, wherein said support is an open top tray, and flowing said mixture into said tray to a depth of from about 1/16 inch to about ¼ inch.

16. A method of making a vermin trap comprising heating a thermoplastic pressure sensitive adhesive to convert it to a liquid state, said adhesive having a flow temperature above 120° F. and being heated to a temperature of between 250° F. and about 300° F., agitating said liquid adhesive with a gas to obtain a mixture of said gas in said liquid adhesive, pressurizing said mixture from about 1,000 psi to about 1,500 psi, flowing said pressurized mixture at atmospheric pressure onto a support, whereby said gas is released to form bubbles trapped in said liquid adhesive, and cooling said liquid adhesive.

17. The method according to claim 16, wherein said adhesive is heated to a temperature of about 275° F.

18. The method according to claim 16, wherein said gas is carbon dioxide.

19. The method according to claim 18, wherein said adhesive is heated to a temperature of about 275° F.

20. The method according to claim 19, wherein said support is an open top tray, and flowing said mixture into said tray to a depth of from about 1/16 inch to about ¼ inch.

* * * * *